June 3, 1941.  D. B. GISH  2,244,147
SHOCK ABSORBING DEVICE
Filed Sept. 17, 1940
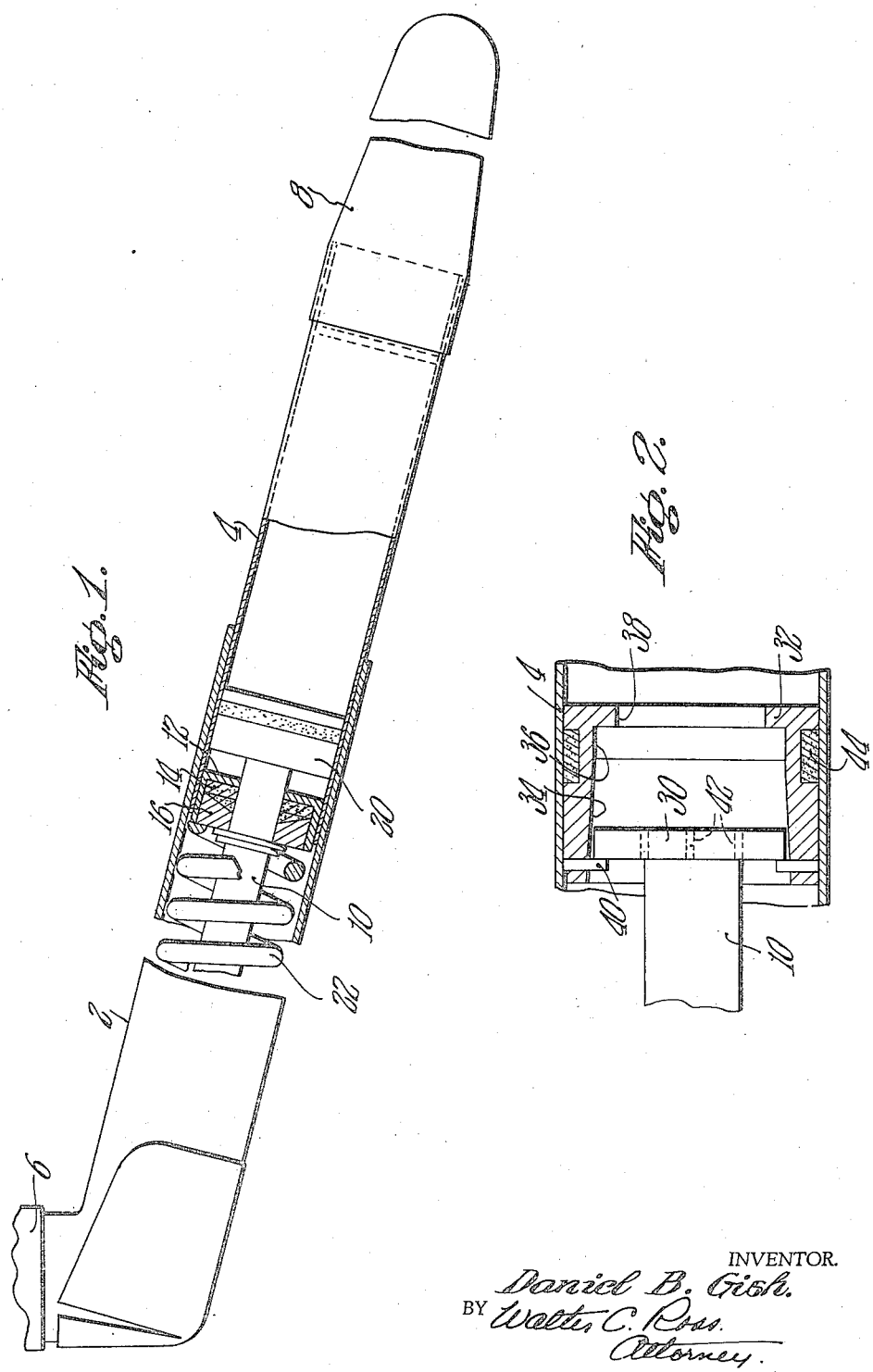
INVENTOR.
Daniel B. Gish.
BY Walter C. Ross.
Attorney.

Patented June 3, 1941

2,244,147

UNITED STATES PATENT OFFICE 2,244,147

SHOCK ABSORBING DEVICE

Daniel B. Gish, West Springfield, Mass.

Application September 17, 1940, Serial No. 357,150

2 Claims. (Cl. 188—96)

This invention relates to improvements in shock absorbing or cushioning devices to absorb, cushion and overcome shocks, stresses and strains.

The invention is adapted for broad application and while it is to be shown and described in connection with a strut construction such as used in connection with aircraft, it will be understood that such disclosure is for illustrative purposes only and not by way of limitation.

The principal objects of the invention are directed to absorbing or cushioning devices wherein a piston is reciprocable in a cylinder and is so constructed and arranged as to increase the cushioning effect when the piston moves from its initial position in the cylinder while at the same time as the piston moves to distended position the construction is such that relatively less resistance is offered the piston by the cylinder fluid.

Various novel objects and advantages of the invention and the novel features of construction will be observed from the following description of the present preferred form thereof, reference being had to the drawing wherein:

Fig. 1 is a side elevational view of a shock or cushioning device for aircraft or the like embodying the novel features of the invention with parts in section for clearness; and Fig. 2 is an enlarged sectional elevational view showing the piston of the apparatus in association with a cylinder.

Referring to the drawing more in detail, the invention will be fully described, it being understood that the invention is adapted for other uses than in connection with aircraft apparatus.

Outer and inner tubes 2 and 4 represent such tubes as are ordinarily used in connection with the landing gear of aircraft. The tubes are relatively slidable and on the outer end of each there are fittings 6 and 8 of suitable form for attaching the same to the parts of the aircraft and landing gear. As stated, the outer and inner tubes 2 and 4 are relatively slidable between distended and retracted positions and there may be means associated therewith if desired to prevent relative rotation thereof.

A piston rod 10 which may be tubular in form has its upper end secured in some suitable manner to the outer tube 2. A stuffing box construction including a cup-shaped member 12 fixed to the inner end of tube 4 has packings 14 and a gland 16 through which the piston rod 10 slides. This stuffing box may be varied in construction within wide limits. A piston indicated generally by 20 is associated with the end of the piston rod as shown.

The cylinder or tube 4 carries a fluid of some suitable form such as glycerine, oil, or the like and a spring or springs 22 are disposed between the stuffing box and upper end of tube 2.

The opposite ends of the construction are secured to relatively movable parts, such as would be the case in connection with aircraft. As the parts are moved towards one another, the spring or springs, and the piston acting on the fluid resists telescopic action of the tubes to retracted position while when the forces acting on the parts are removed, the tubes are moved or returned to distended position by the spring or springs under the control of the piston which frictionally engages the cylinder or tube 4.

The piston construction is shown in Fig. 2 and the parts are related when the tubes are in distended relation.

The piston includes an inner piston member 30 on the end of the piston rod 10 and an outer piston cage or cup 32.

The cup 32 is hollowed out to provide a tapering bore 34, and a bore 36 of a diameter adapted to receive the piston 30 and has a lower opening 38. Stops or abutments 40 of some suitable form are provided against which the piston 30 may abut so that in moving from retracted position the said piston will carry the member 32 along the tube 4. That part of the member 32 having the opening 38 may be called the lower wall while the upper part with which the stops are associated may be called the upper end.

With the tubes in distended position, as shown in Fig. 1, and as forces are applied thereto to move them to retracted position, the parts of the piston construction are in the position as shown in Fig. 2. The forces referred to cause the piston 30 to act on the fluid in cylinder 4 but since there is clearance between the bore 34 of member 32 and piston 30 some fluid passes through opening 38 and past the said piston. Therefor in the initial relative movement of the tubes 2 and 4 and which moves piston 30 downwardly of tube 4 the fluid offers less resistance than when the piston 30 moves into the bore 36 of member 32 so that the piston then moves the member 32 against the fluid. In the position of the piston 30 as shown in Fig. 2 the member 32 is held or its movement retarded by a yieldable packing such as 44. The said packing allows the part 32 to be moved by piston 30 when the latter abuts the former.

The bore 34 and piston may be proportioned in order to provide the passage of any amount of fluid past piston 30 in its initial movement. In some cases it may be desirable to provide for the passage of more fluid than in others and the distance through which the piston 30 travels before it acts on member 32 may be varied to suit various conditions.

When piston 30 is seated in bore 36 of member 32 so as to cause the said member to move along the tube the full piston action is attained for the absorbing or cushioning function. There may be, if desired, bleed openings such as 42 in the piston to more or less control the action thereof.

When the tubes are moved from retracted to distended position so as to move piston 30 upwardly of tube 4 the said piston initially moves relative to member 32 until the projections 40 are engaged thereby. With the piston engaging the said projections the member 32 is moved by the piston which is then in bore 34. In this relative position the clearance between the piston 30 and bore 34 allows fluid to pass by the piston to facilitate the parts readily returning to retracted position.

Ordinarily complicated valve devices are used to permit fluid to pass the piston but such are not only expensive to produce but consist of relatively movable parts that are easily rendered unworkable or unfit for service.

The member 32 may be made in a size relative to the tube 4 so as to frictionally engage said tube and offer the desired resistance to the movement of the tubes from retracted to distended cushioning position but a packing 44 of some suitable material such as rubber, leather, or some yieldable composition is provided which frictionally engages the said tube 4. The packing eliminates the accurate fitting of the member 32 within the tube which is costly and may be used in lieu of accurately fitting said member and tube.

It will be observed that the novel features of the invention may be used in connection with various apparatus to provide the cushioning or shock absorbing function. As special features of the invention, it will be noted that the piston in its initial movement is not resisted by the fluid to the fullest extent because a certain desired amount of fluid may flow past the cylinder until the piston engages and acts on the outer member. Also as another feature in the return stroke of the piston, the inner piston is related to the outer part in such a way that fluid may flow therepast which overcomes to the desired degree the resistance which the fluid offers to the return movement of the piston.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. An apparatus of the class described comprising in combination, a cylinder, a piston rod, a piston fixed on said rod, a member slidable in said cylinder having a bore in which said piston is disposed and a lower wall provided with an opening, the said bore having an upper part relatively larger than said piston and a lower part in which said piston is receivable and being arranged whereby said piston may move axially in said bore, and stop means in the upper end of said bore engageable by said piston, all adapted and arranged whereby the said piston may move initially from the larger part of said bore to abut the end wall of the member and act thereon and move in an opposite direction and engage said stop means and move said member in said opposite direction.

2. An apparatus of the class described comprising in combination, a cylinder, a piston rod, a piston fixed on said rod, a member slidable in said cylinder having a bore in which said piston is disposed and a lower wall provided with an opening, the said bore having an upper part relatively larger than said piston and a lower part in which said piston is receivable and being arranged whereby said piston may move axially in said bore, stop means in the upper end of said bore engageable by said piston, all adapted and arranged whereby the said piston may move initially from the larger part of said bore to abut the end wall of the member and act thereon and move in an opposite direction and engage said stop means and move said member in said opposite direction, and a packing associated with said member for engaging said cylinder.

DANIEL B. GISH.